J. A. SEXAUER.
BREAD MOLDING MACHINE.
APPLICATION FILED APR. 15, 1909.

964,321.

Patented July 12, 1910.

2 SHEETS—SHEET 1.

Witnesses

Inventor
John A. Sexauer
By E. E. Vrooman,
his Attorney.

J. A. SEXAUER.
BREAD MOLDING MACHINE.
APPLICATION FILED APR. 15, 1909.

964,321.

Patented July 12, 1910.

2 SHEETS—SHEET 2.

Witnesses

Inventor
John A. Sexauer.
By E. E. Vrooman
his Attorney.

UNITED STATES PATENT OFFICE.

JOHN A. SEXAUER, OF SIDNEY, OHIO.

BREAD-MOLDING MACHINE.

964,321.   Specification of Letters Patent.   Patented July 12, 1910.

Application filed April 15, 1909. Serial No. 490,074.

*To all whom it may concern:*

Be it known that I, JOHN A. SEXAUER, a citizen of the United States, residing at Sidney, in the county of Shelby and State of Ohio, have invented certain new and useful Improvements in Bread-Molding Machines, of which the following is a specification, reference being had therein to the accompanying drawing.

This invention relates to machines for molding or shaping dough into loaf form, and the principal object of the same is to provide a machine of the type specified in which the dough is first rolled into a thin flat sheet and then through the medium of novel coöperating mechanism rolled upon itself and shaped and then delivered into a suitable receptacle ready to be placed in an oven.

In carrying out the invention as generally stated above it is contemplated employing a machine the parts of which may be duplicated so that two or more loaves may be simultaneously shaped and which is provided with a feeding hopper which delivers the dough to a pair of spaced apart rollers which flatten the dough and deliver the dough to another set of rollers which thins the flattened dough, then delivers the thin flat sheet of dough to be acted upon by oppositely rotating roller and belt mechanism which rolls the sheet upon itself and permits the same to fall upon a conveyer and in contact with an adjustable die or shaping board, after which the dough is removed from the die and delivered into a suitable receptacle from which it may be taken to be placed in the baking oven.

In producing a machine capable of performing the above stated functions it will, of course, be readily understood that the essential features thereof are susceptible of wide range as to details and structural arrangements, but one preferred and practical embodiment of such a machine is set forth in the following specification and illustrated in the accompanying drawings, wherein—

Figure 1:
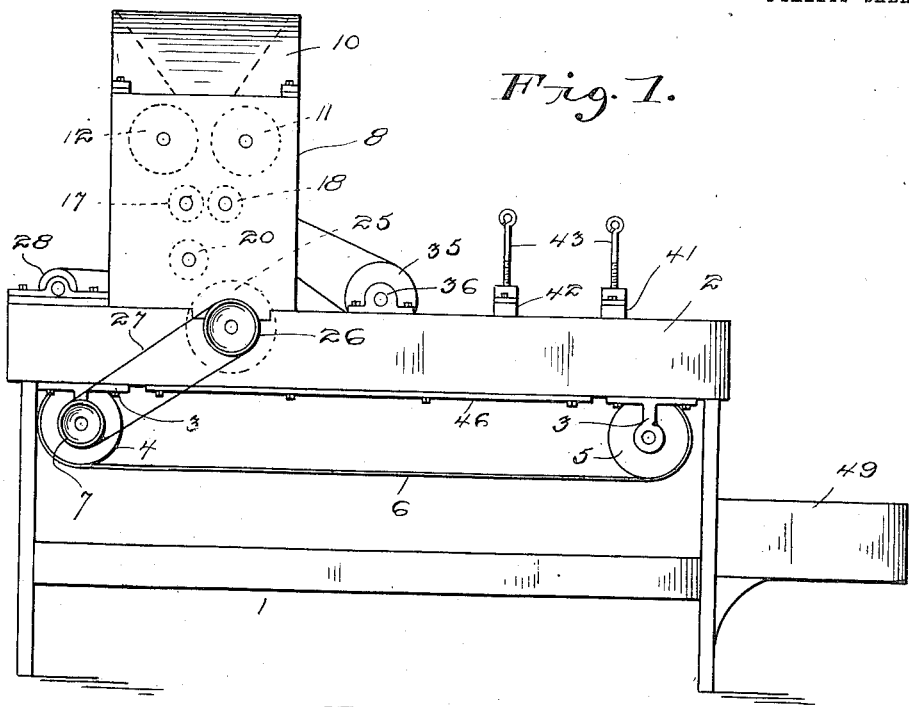
Figure 3:
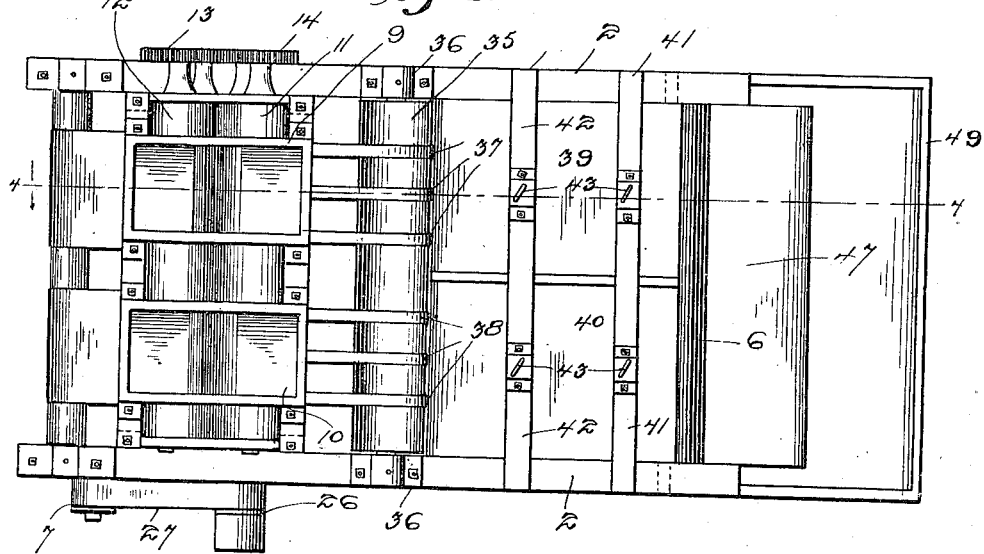
Figure 2:
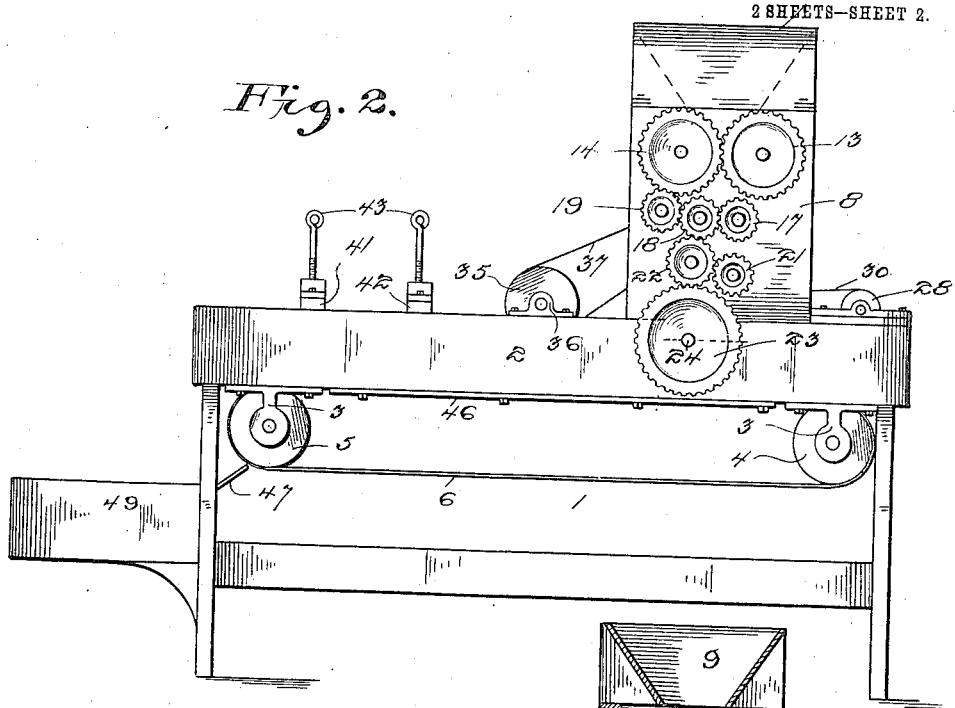
Figure 4:
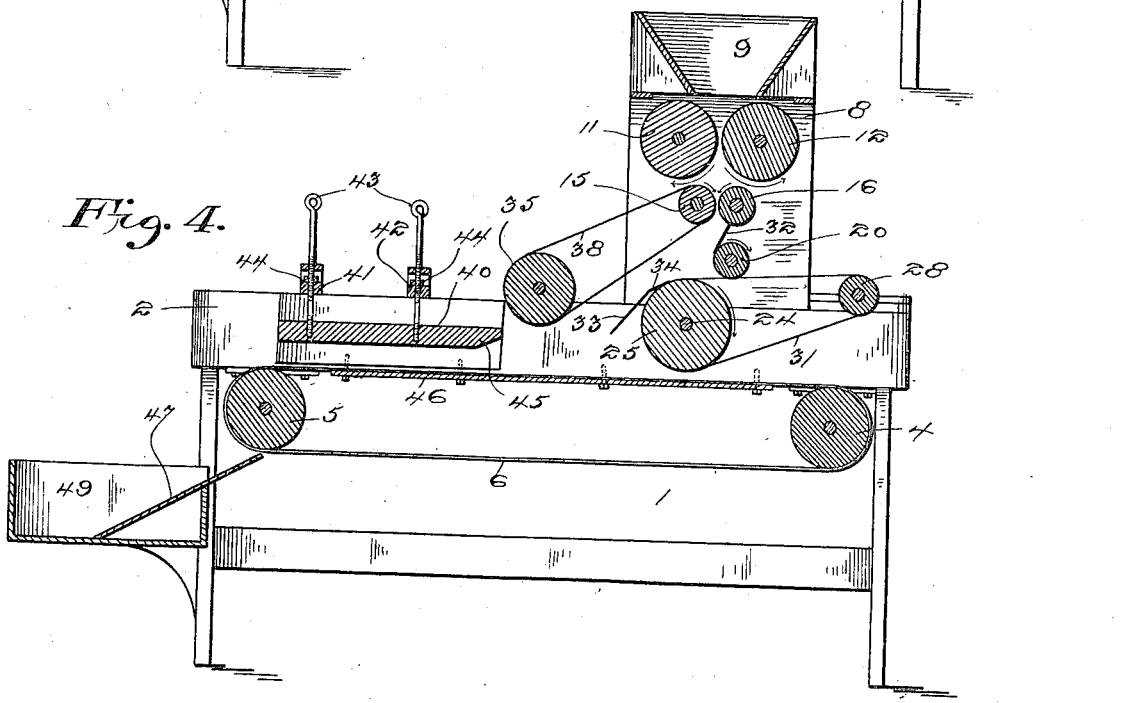

Figure 1 is a view in side elevation of the improved molding machine. Fig. 2 is a similar view of the opposite side thereof. Fig. 3 is a top plan view. Fig. 4 is a vertical longitudinal sectional view taken on the line 4—4, Fig. 3.

Referring to said drawings by numerals, 1 designates a table or bench having an open top and provided with side beams 2 the lower edge of which carries pendent hanger bearings 3 adjacent to each end in which rollers 4 and 5 are mounted, said rollers 4 and 5 extending transversely of the table or bench and carry an endless belt 6 preferably of canvas which extends substantially the entire longitudinal length of said table or bench. The shaft of roller 4 extends beyond one of its hanger bearings and may be equipped with a pulley, gear wheel, or the equivalent, as indicated at 7, by means of which the same may be connected with a source of rotary power. Or, if preferred, said shaft may have a direct connection with a rotary motor, as will be obvious.

The side beams 2 adjacent to one of their ends, carry an upstanding substantially rectangular casing 8 the open top portion of which is provided with two spaced-apart hoppers 9 and 10 which are bolted or otherwise detachably secured thereon so as to permit the same to be readily removed when access is necessary or desirable to the interior of said casing. Immediately below the discharge outlets of said hoppers, a pair of rollers 11 and 12 extend transversely across the casing, said rollers being spaced apart a slight distance and having one end of their shafts projecting through one side of the casing and equipped with gear wheels 13 and 14 which are in mesh with each other, so as to cause said rollers to rotate in an opposite direction. A second pair of rollers 15 and 16 are similarly arranged in the casing just below the rollers 11 and 12, said rollers 15 and 16 being of small diameter and being relatively closer together than the rollers 11 and 12. The rollers 15 and 16 also have one end of their shafts projecting through the side of the casing and are provided with the meshed gears 17 and 18, one of said last mentioned gears being in engagement with one of the gears of the rollers 11 and 12 through the medium of the idler gear 19. A roller 20 extends transversely of the said casing below the roller 16, the shaft of which projects through one side of the casing and carries a gear 21 held in mesh with an idler gear 22 which is also in mesh with gear wheel 18. Said idler gear 22 receives its power from a large gear 23 mounted on one end of a shaft 24 carried by a large roller 25 which extends transversely of the base of the casing 8, the shaft of said roller being mounted in the side beams 2 and having one of its ends provided with a pulley or the like 26 which may have a belt connection 27 with the pulley 7 carried by the shaft of roller 4. The roller 25 is connected with a small roller 28 mounted in bearing 29 at the rear end of the side beams 2 by means of two belts 30 and 31, said belts being spaced apart and arranged so that one of the same will be in position to act upon the material from each hopper, as will be presently explained. A partition plate 32 extends transversely of the casing 8 and is inclined and arranged between the rollers 20 and 16, so as to prevent material passing between the same. A second plate 33 is arranged in front of roller 25 and has one of its edges bent or beveled as indicated at 34 and contacting with the surface of said roller. A roller 35 extends transversely of the table or bench 1 and has its shaft mounted in bearings 36 carried by the upper edges of the side beams 2, said roller being arranged in advance of the casing 8 and provided with a plurality of belts which connect with roller 15. Said belts are preferably arranged in sets of three, as indicated at 37—38, Fig. 3, one set being for the material from each hopper. A pair of die boards 39 and 40 are supported over the belt 6 by means of the supporting bars 41—42 through which adjusting screws 43 pass and engage with said boards and by means of which said boards may be adjusted relatively to said belt, as will be obvious. If desired, lock nuts 44 may be employed for holding said boards in their adjusted positions. Said boards are of duplicate construction and have their front edges beveled as indicated at 45 to facilitate the passage of material under the same. A sheet metal or other material plate 46 is carried by the side beams 2 for imparting rigidity to the upper flight of the belt 6.

In operation the material is placed into the hoppers and fed between the rollers 11 and 12 which flattens the same into sheet form after which it is acted upon by rollers 15 and 16 and thinned out, and then drops onto belts 31—30 and through contact with roller 20 and the sets of belts 37—38, caused to roll upon itself in a compact manner and fall onto plate 33 and then drop to belt 6 which conveys the material beneath the die boards 39—40, finishing the shaping of the material, and then delivers the material to an inclined chute board 47 carried by the front end of the machine and which communicates with a receptacle 49 having a suitable connection with the table or bench.

It will be seen from the foregoing that the described machine provided means for thoroughly acting on the dough to properly shape it in a quick and automatic manner thereby greatly facilitating the operation of shaping the dough, and at the same time dispensing with the manual labor heretofore incidental to such work.

What I claim as my invention is:—

A device of the character described, comprising a table, a conveying belt traveling beneath said table, a casing mounted on said table and having its upper portion divided into a plurality of hoppers, an upper and a lower pair of dough-flattening rollers mounted beneath said hoppers, a roller transversely mounted on the table, a feed belt connection between the same and one of the members of the lower pair of flattening rollers, another roller arranged beneath the other lower flattening roller, a guide plate arranged between said last-mentioned rollers to deflect dough therefrom, a pair of rollers mounted in the table, one of the same being beneath the hoppers, a belt connecting said last-mentioned rollers and adapted to cause the dough to be rolled upon itself, and a guide plate arranged in front of the roller that is beneath the hoppers and adapted to guide the rolled dough to said conveying belt, forming dies mounted above said conveying belt, and means for receiving the finished article.

In testimony whereof I hereunto affix my signature in presence of two witnesses.

JOHN A. SEXAUER.

Witnesses:
F. A. WAGNER,
D. M. PRUDEN.